United States Patent
Chen et al.

(10) Patent No.: US 11,936,848 B2
(45) Date of Patent: Mar. 19, 2024

(54) BI-DIRECTIONAL OPTICAL FLOW AND DECODER-SIDE MOTION VECTOR REFINEMENT FOR VIDEO CODING

(71) Applicant: BEIJING DAJIA INTERNET INFORMATION TECHNOLOGY CO., LTD., Beijing (CN)

(72) Inventors: Yi-Wen Chen, San Diego, CA (US); Xiaoyu Xiu, San Diego, CA (US); Tsung-Chuan Ma, San Diego, CA (US); Xianglin Wang, San Diego, CA (US)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 242 days.

(21) Appl. No.: 17/468,307

(22) Filed: Sep. 7, 2021

(65) Prior Publication Data

US 2021/0400261 A1 Dec. 23, 2021

Related U.S. Application Data

(63) Continuation of application No. PCT/US2020/021168, filed on Mar. 5, 2020.
(Continued)

(51) Int. Cl.
*H04N 19/105* (2014.01)
*H04N 19/132* (2014.01)
(Continued)

(52) U.S. Cl.
CPC ......... *H04N 19/105* (2014.11); *H04N 19/132* (2014.11); *H04N 19/137* (2014.11);
(Continued)

(58) Field of Classification Search
None
See application file for complete search history.

(56) References Cited

U.S. PATENT DOCUMENTS 11,109,053 B2 * 8/2021 Abe ................ H04N 19/46
2016/0286232 A1 9/2016 Li et al.
(Continued)

FOREIGN PATENT DOCUMENTS

WO 2017205701 A1 11/2017
WO 2018028559 A1 2/2018

OTHER PUBLICATIONS

Chen, Yi-Wen, et al., "Non-CE9: Mutually exclusive DMVR/BDOF at CU level", Joint Video Experts Team (JVET) of ITU-T SG 16 WP 3 and ISO/IEC JTC 1/SC 29/WG 11, JVET-N0328, 14th Meeting: Geneva, CH Mar. 19-27, 2019, (3p).
(Continued)

*Primary Examiner* — Stefan Gadomski
(74) *Attorney, Agent, or Firm* — Arch & Lake LLP

(57) ABSTRACT

Methods and devices are provided for deriving constructed affine merge candidates. The method includes obtaining a first reference picture and a second reference picture associated with an inter mode coded block, where the first reference picture is before a current picture and the second reference picture is after the current picture in display order, obtaining a first motion vector from the inter mode coded block to a reference block in the first reference picture, obtaining a second motion vector from the inter mode coded block to a reference block in the second reference picture, applying bi-directional optical flow (BDOF) or decoder-side motion vector refinement (DMVR) to the inter mode coded block based on a mode information of the inter mode coded block, and predicting a bi-prediction of the inter mode coded block based on the applied BDOF or DMVR.

12 Claims, 8 Drawing Sheets

Related U.S. Application Data

(60) Provisional application No. 62/816,033, filed on Mar. 8, 2019.

(51) Int. Cl.
*H04N 19/137* (2014.01)
*H04N 19/159* (2014.01)
*H04N 19/176* (2014.01)
*H04N 19/46* (2014.01)
*H04N 19/70* (2014.01)

(52) U.S. Cl.
CPC ......... *H04N 19/159* (2014.11); *H04N 19/176* (2014.11); *H04N 19/46* (2014.11); *H04N 19/70* (2014.11)

(56) References Cited

U.S. PATENT DOCUMENTS

| | | | | |
|---|---|---|---|---|
| 2019/0238883 | A1* | 8/2019 | Chen | H04N 19/139 |
| 2020/0154135 | A1* | 5/2020 | Lee | H04N 19/176 |
| 2020/0314445 | A1* | 10/2020 | Park | H04N 19/52 |
| 2021/0185338 | A1* | 6/2021 | Xiu | H04N 19/105 |
| 2021/0368180 | A1* | 11/2021 | Park | H04N 19/139 |
| 2021/0400261 | A1* | 12/2021 | Chen | H04N 19/105 |
| 2022/0030266 | A1* | 1/2022 | Park | H04N 19/157 |
| 2022/0070466 | A1* | 3/2022 | Park | H04N 19/176 |
| 2022/0070487 | A1* | 3/2022 | Park | H04N 19/103 |
| 2022/0078439 | A1* | 3/2022 | Park | H04N 19/176 |
| 2022/0078440 | A1* | 3/2022 | Park | H04N 19/186 |
| 2022/0224911 | A1* | 7/2022 | Park | H04N 19/159 |

OTHER PUBLICATIONS

International Search Report of International Application No. PCT/US2020/021168 dated Jun. 24, 2020, (2p).

Sethuraman, Sriram, "Non-CE9: Co-Existence Analysis for DMVR with BDOF", Joint Video Experts Team (JVET) of ITU-T SG 16 WP 3 and ISO/IEC JTC 1/SC 29/WG 11, JVET-M0223-v4, 13th Meeting, Marrakech, MA, Jan. 18, 2019, (5p).

Hashimoto, Tomonori, et al., Non-CE4: Weighted Prediction with BDOF and Bi-Pre Diction with CU Weights Harmonization, Joint Video Experts Team (JVET) of IT U-T SG 16 WP 3 and ISO/IEC JTC 1/SC 29/WG 11, JVET-M0067-v1, 13th Meeting, Marrakech, MA, Jan. 18, 2019, (11p).

* cited by examiner

BI-DIRECTIONAL OPTICAL FLOW AND DECODER-SIDE MOTION VECTOR REFINEMENT FOR VIDEO CODING

CROSS-REFERENCE TO RELATED APPLICATIONS

This application is a continuation application of International Application No. PCT/US2020/021168, filed on Mar. 5, 2020, which is based upon and claims priority to Provisional Application No. 62/816,033 filed on Mar. 8, 2019, the entire contents of which are incorporated herein by reference in their entireties.

TECHNICAL FIELD

This application is related to video coding and compression. More specifically, this disclosure relates to methods and apparatus for bi-directional optical flow (BDOF) method and decoder-side motion vector refinement (DMVR) for video coding.

BACKGROUND

Various video coding techniques may be used to compress video data. Video coding is performed according to one or more video coding standards. For example, video coding standards include versatile video coding (VVC), joint exploration test model (JEM), high-efficiency video coding (H.265/HEVC), advanced video coding (H.264/AVC), moving picture experts group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate while avoiding or minimizing degradations to video quality.

SUMMARY

Examples of the present disclosure provides methods and apparatus for bi-directional optical flow (BDOF) method and decoder-side motion vector refinement (DMVR) for video coding.

According to a first aspect of the present disclosure, a computer-implemented method for motion prediction is provided. The method may include obtaining a first reference picture and a second reference picture associated with an inter mode coded block, where the first reference picture may be before a current picture and the second reference picture may be after the current picture in display order, obtaining a first motion vector from the inter mode coded block to a reference block in the first reference picture, obtaining a second motion vector from the inter mode coded block to a reference block in the second reference picture, applying bi-directional optical flow (BDOF) or decoder-side motion vector refinement (DMVR) to the inter mode coded block based on a mode information of the inter mode coded block, where the mode information includes the first motion vector and second motion vector and predicting a bi-prediction of the inter mode coded block based on the applied BDOF or DMVR.

According to a second aspect of the present disclosure, a computing device is provided. The computing device may include one or more processors, a non-transitory computer-readable memory storing instructions executable by the one or more processors. The one or more processors may be configured to obtain a first reference picture and a second reference picture associated with an inter mode coded block, where the first reference picture is before a current picture and the second reference picture is after the current picture in display order, obtain a first motion vector from the inter mode coded block to a reference block in the first reference picture, obtain a second motion vector from the inter mode coded block to a reference block in the second reference picture, apply bi-directional optical flow (BDOF) or decoder-side motion vector refinement (DMVR) to the inter mode coded block based on a mode information of the inter mode coded block, where the mode information includes the first motion vector and second motion vector, and predict a bi-prediction of the inter mode coded block based on the applied BDOF or DMVR.

According to a third aspect of the present disclosure, a non-transitory computer-readable storage medium having stored therein instructions is provided. When the instructions are executed by one or more processors of the apparatus, the instructions may cause the apparatus to perform: obtaining a first reference picture and a second reference picture associated with an inter mode coded block, where the first reference picture is before a current picture and the second reference picture is after the current picture in display order, obtaining a first motion vector from the inter mode coded block to a reference block in the first reference picture, obtaining a second motion vector from the inter mode coded block to a reference block in the second reference picture, applying bi-directional optical flow (BDOF) or decoder-side motion vector refinement (DMVR) to the inter mode coded block based on a mode information of the inter mode coded block, where the mode information includes the first motion vector and second motion vector and predicting a bi-prediction of the inter mode coded block based on the applied BDOF or DMVR.

It is to be understood that both the foregoing general description and the following detailed description are examples only and are not restrictive of the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION

Figure 1:
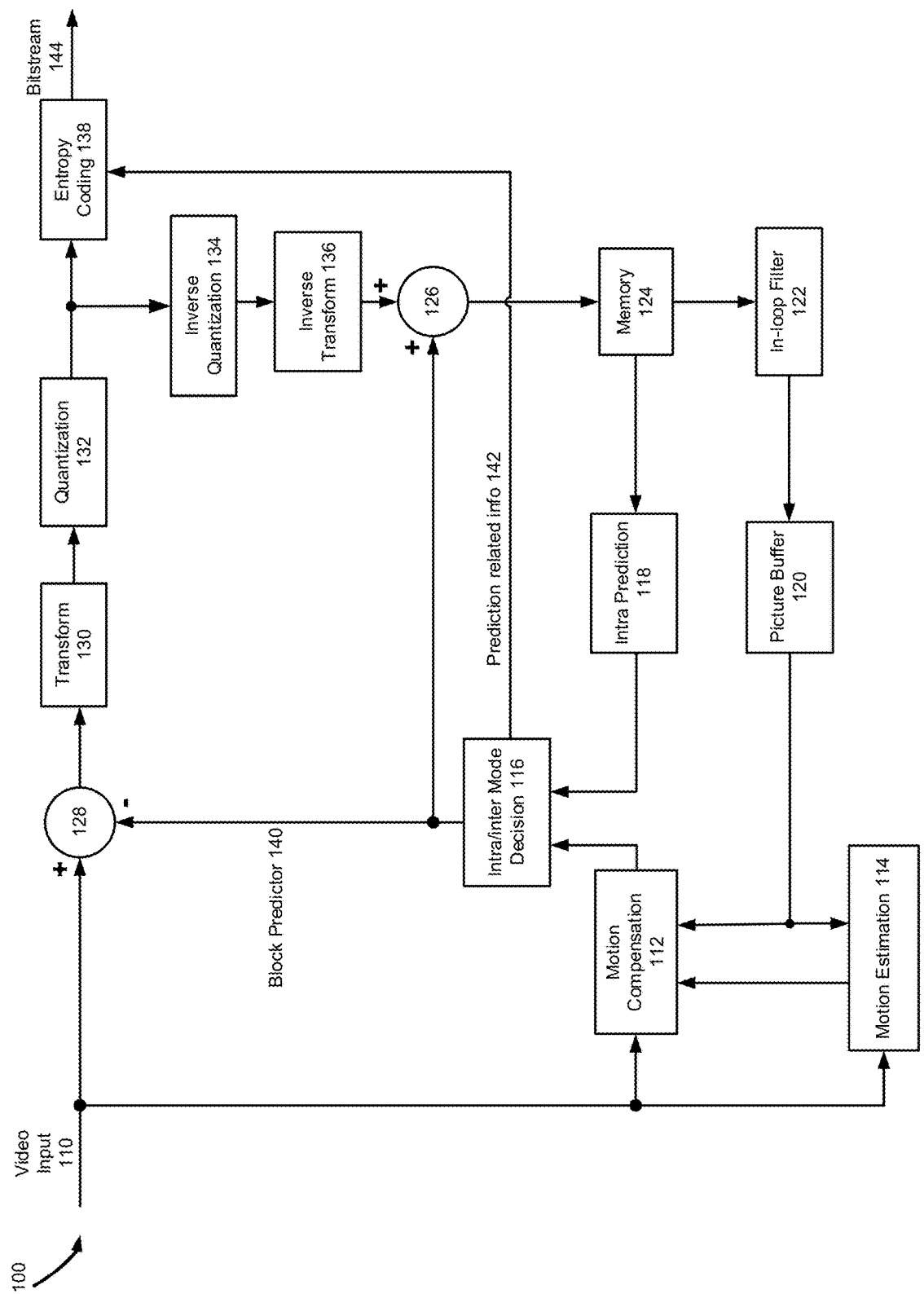
FIG. 1 is a block diagram of an encoder, according to an example of the present disclosure.

Reference will now be made in detail to example embodiments, examples of which are illustrated in the accompanying drawings. The following description refers to the accompanying drawings in which the same numbers in different drawings represent the same or similar elements unless otherwise represented. The implementations set forth in the following description of example embodiments do not represent all implementations consistent with the disclosure. Instead, they are merely examples of apparatuses and methods consistent with aspects related to the disclosure as recited in the appended claims.

The terminology used in the present disclosure is for the purpose of describing particular embodiments only and is not intended to limit the present disclosure. As used in the present disclosure and the appended claims, the singular forms "a," "an," and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms "first," "second," "third," etc. may be used herein to describe various information, the information should not be limited by these terms. These terms are only used to distinguish one category of information from another. For example, without departing from the scope of the embodiment of the present disclosure, first information may be termed as second information; and similarly, second information may also be termed as first information. As used herein, the term "if" may be understood to mean "when" or "upon" or "in response to a judgment" depending on the context.

The first version of the HEVC standard was finalized in October 2013, which offers approximately 50% bit-rate saving or equivalent perceptual quality compared to the prior generation video coding standard H.264/MPEG AVC. Although the HEVC standard provides significant coding improvements than its predecessor, there is evidence that superior coding efficiency can be achieved with additional coding tools over HEVC. Based on that, both VCEG and MPEG started the exploration work of new coding technologies for future video coding standardization. one Joint Video Exploration Team (JVET) was formed in October 2015 by ITU-T VECG and ISO/IEC MPEG to begin a significant study of advanced technologies that could enable substantial enhancement of coding efficiency. One reference software called the joint exploration model (JEM) was maintained by the JVET by integrating several additional coding tools on top of the HEVC test model (HM).

In October 2017, the joint call for proposals (CfP) on video compression with capability beyond HEVC was issued by ITU-T and ISO/IEC. In April 2018, 23 CfP responses were received and evaluated at the 10-th JVET meeting, which demonstrated compression efficiency gain over the HEVC around 40%. Based on such evaluation results, the JVET launched a new project to develop the new generation video coding standard that is named as Versatile Video Coding (VVC). In the same month, one reference software codebase, called VVC test model (VTM), was established for demonstrating a reference implementation of the VVC standard.

Like HEVC, the VVC is built upon the block-based hybrid video coding framework. FIG. 1 gives the block diagram of a generic block-based hybrid video encoding system. Specifically, FIG. 1 shows a typical encoder 100. The encoder 100 has video input 110, motion compensation 112, motion estimation 114, intra/inter mode decision 116, block predictor 140, adder 128, transform 130, quantization 132, prediction related info 142, intra prediction 118, picture buffer 120, inverse quantization 134, inverse transform 136, adder 126, memory 124, in-loop filter 122, entropy coding 138, and bitstream 144.

In FIG. 1, the input video signal is processed block by block (called coding units (CUs)). In VTM-1.0, a CU can be up to 128×128 pixels. However, different from the HEVC which partitions blocks only based on quad-trees, in the VVC, one coding tree unit (CTU) is split into CUs to adapt to varying local characteristics based on quad/binary/ternary-tree.

Additionally, the concept of multiple partition unit type in the HEVC is removed, i.e., the separation of CU, prediction unit (PU) and transform unit (TU) does not exist in the VVC anymore; instead, each CU is always used as the basic unit for both prediction and transform without further partitions. In the multi-type tree structure, one CTU is firstly partitioned by a quad-tree structure. Then, each quad-tree leaf node can be further partitioned by a binary and ternary tree structure.

As shown in FIGS. 3A, 3B, 3C, 3D, and 3F (described below), there are five splitting types, including a quaternary partitioning, horizontal binary partitioning, vertical binary partitioning, horizontal ternary partitioning, and vertical ternary partitioning, respectively.

Figure 3:
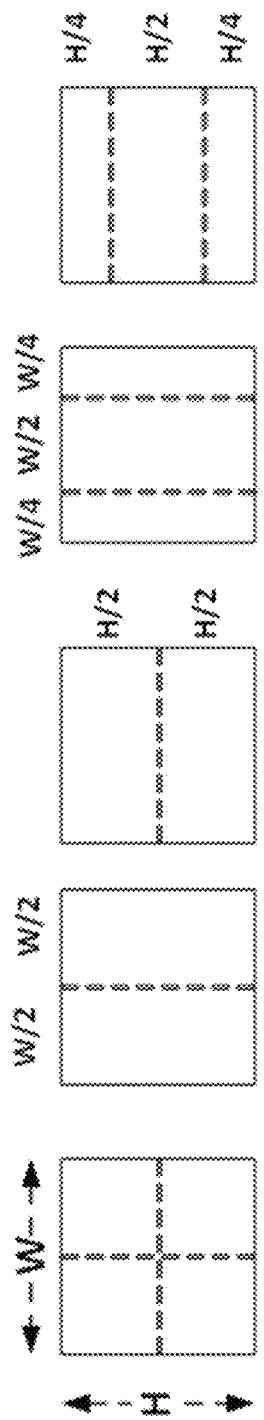
FIG. 3A is a diagram illustrating block partitions in a multi-type tree structure, according to an example of the present disclosure.
FIG. 3B is a diagram illustrating block partitions in a multi-type tree structure, according to an example of the present disclosure.
FIG. 3C is a diagram illustrating block partitions in a multi-type tree structure, according to an example of the present disclosure.
FIG. 3D is a diagram illustrating block partitions in a multi-type tree structure, according to an example of the present disclosure.
FIG. 3E is a diagram illustrating block partitions in a multi-type tree structure, according to an example of the present disclosure.

FIG. 3A shows a diagram illustrating block quaternary partition in a multi-type tree structure, in accordance with the present disclosure.

FIG. 3B shows a diagram illustrating block vertical binary partition in a multi-type tree structure, in accordance with the present disclosure.

FIG. 3C shows a diagram illustrating block horizontal binary partition in a multi-type tree structure, in accordance with the present disclosure.

FIG. 3D shows a diagram illustrating block vertical ternary partition in a multi-type tree structure, in accordance with the present disclosure.

FIG. 3E shows a diagram illustrating block horizontal ternary partition in a multi-type tree structure, in accordance with the present disclosure.

In FIG. 1, spatial prediction and/or temporal prediction may be performed. The spatial prediction (or "intra prediction") uses pixels from the samples of already coded neighboring blocks (which are called reference samples) in the same video picture/slice to predict the current video block. The spatial prediction reduces spatial redundancy inherent in the video signal. The temporal prediction (also referred to as "inter prediction" or "motion compensated prediction") uses reconstructed pixels from the already coded video pictures to predict the current video block. The temporal prediction reduces temporal redundancy inherent in the video signal. The temporal prediction signal for a given CU is usually signaled by one or more motion vectors (MVs), which indicate the amount and the direction of motion between the current CU and its temporal reference.

Also, if multiple reference pictures are supported, one reference picture index is additionally sent, which is used to identify from which reference picture in the reference picture store the temporal prediction signal comes. After spatial and/or temporal prediction, the mode decision block in the encoder chooses the best prediction mode, for example, based on the rate-distortion optimization method. The prediction block is then subtracted from the current video block, and the prediction residual is de-correlated using transform and quantized. The quantized residual coefficients are inverse quantized and inverse transformed to form the reconstructed residual, which is then added back to the prediction block to form the reconstructed signal of the CU. Further, in-loop filtering, such as deblocking filter, sample adaptive offset (SAO), and adaptive in-loop filter (ALF) may be applied on the reconstructed CU before it is put in the reference picture store and used to code future video blocks. To form the output video bit-stream, coding mode (inter or intra), prediction mode information, motion information, and quantized residual coefficients are all sent to the entropy coding unit to be further compressed and packed to form the bit-stream.

Figure 2:
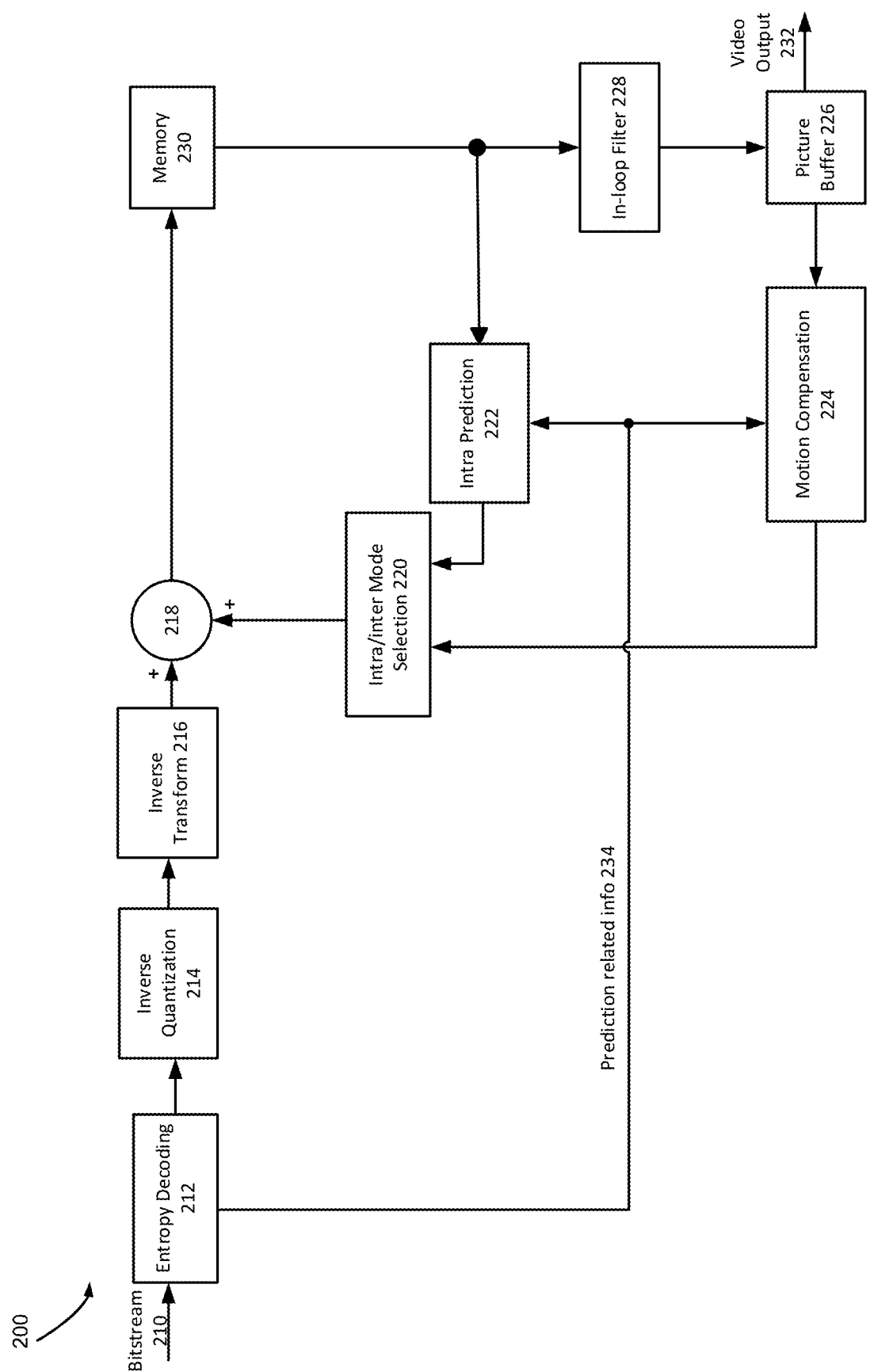
FIG. 2 is a block diagram of a decoder, according to an example of the present disclosure.

FIG. 2 gives a general block diagram of a block-based video decoder. Specifically, FIG. 2 shows a typical decoder 200 block diagram. Decoder 200 has bitstream 210, entropy decoding 212, inverse quantization 214, inverse transform 216, adder 218, intra/inter mode selection 220, intra prediction 222, memory 230, in-loop filter 228, motion compensation 224, picture buffer 226, prediction related info 234, and video output 232.

In FIG. 2, the video bit-stream is first entropy decoded at entropy decoding unit. The coding mode and prediction information are sent to either the spatial prediction unit (if intra coded) or the temporal prediction unit (if inter coded) to form the prediction block. The residual transform coefficients are sent to the inverse quantization unit and inverse transform unit to reconstruct the residual block. The prediction block and the residual block are then added together. The reconstructed block may further go through in-loop filtering before it is stored in reference picture storage. The reconstructed video in reference picture storage is then sent out to drive a display device, as well as used to predict future video blocks.

Bi-Directional Optical Flow (BDOF)

Figure 4:
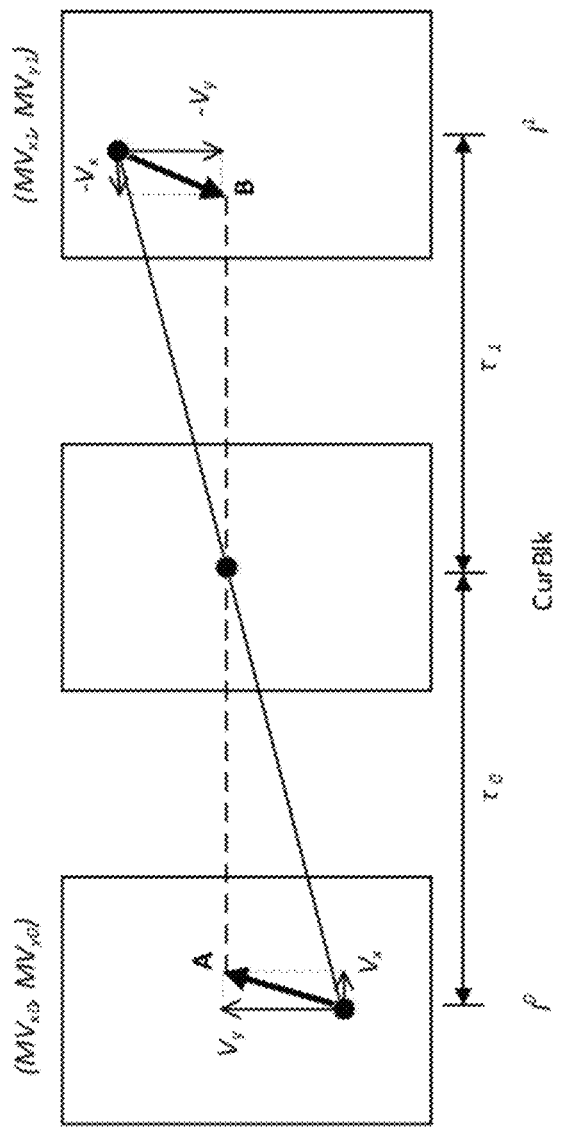
FIG. 4 is a diagram illustration of a bi-directional optical flow (BDOF) model, according to an example of the present disclosure.

Conventional bi-prediction in video coding is a simple combination of two temporal prediction blocks obtained from the reference pictures that are already reconstructed. However, due to the limitation of the block-based motion compensation, there could be remaining small motion that can be observed between the samples of two prediction blocks, thus reducing the efficiency of motion compensated prediction. BDOF is applied in the VVC to lower the impacts of such motion for every sample inside one block. Specifically, as shown in FIG. 4, the BDOF is a sample-wise motion refinement that is performed on top of the block-based motion-compensated predictions when bi-prediction is used. Where FIG. 4 shows an illustration of the intra modes in the VVC, in accordance with the present disclosure. The motion refinement $(v_x, v_y)$ of each 4×4 sub-block is calculated by minimizing the difference between L0 and L1 prediction samples after the BDOF is applied inside one 6×6 window $\Omega$ around the sub-block. Specifically, the value of $(v_x, v_y)$ is derived as $$v_x = S_1 > 0 ? \text{clip3}(-th_{BDOF}, th_{BDOF}, -((S_3 \cdot 2^3) \\ >> \lfloor \log_2 s_1 \rfloor)) : 0$$

$$v_y = S_5 > 0 ? \text{clip3}(-th_{BDOF}, th_{BDOF}, -((S_6 \cdot 2^3 ((v_x s_{2,m}) \\ << n_{s_2} + v_x s_{2,s})/2) >> \lfloor \log_2 S_5 \rfloor)) : \quad (1)$$

where $\lfloor \cdot \rfloor$ is the floor function; clip3(min, max, x) is a function that clips a given value x inside the range of [min, max]; the symbol >> represents bitwise right shift operation; the symbol << represents bitwise left shift operation; $th_{BDOF}$ is the motion refinement threshold to prevent the propagated errors due to irregular local motion, which is equal to $2^{13-BD}$ where BD is the bit-depth of input video. In (1), $$S_{2,m} = S_2 >> n_{S_2}, S_{2,s} = S_2 \& (2^{n_{S_2}} - 1).$$

The values of $S_1$, $S_2$, $S_3$, $S_5$ and $S_6$ are calculated as $$S_1 = \sum_{(i,j) \in \Omega} \psi_x(i, j) \cdot \psi_x(i, j), \quad (2)$$
$$S_2 = \sum_{(i,j) \in \Omega} \psi_x(i, j) \cdot \psi_y(i, j)$$
$$S_3 = \sum_{(i,j) \in \Omega} \theta(i, j) \cdot \psi_x(i, j)$$
$$S_5 = \sum_{(i,j) \in \Omega} \psi_y(i, j) \cdot \psi_y(i, j)$$
$$S_6 = \sum_{(i,j) \in \Omega} \theta(i, j) \cdot \psi_y(i, j)$$

where $$\psi_x(i, j) = \left( \frac{\partial I^{(1)}}{\partial x}(i, j) + \frac{\partial I^{(0)}}{\partial x}(i, j) \right) \gg 3 \quad (3)$$
$$\psi_y(i, j) = \left( \frac{\partial I^{(1)}}{\partial y}(i, j) + \frac{\partial I^{(0)}}{\partial y}(i, j) \right) \gg 3$$
$$\theta(i, j) = (I^{(1)}(i, j) \gg 6) - (I^{(0)}(i, j) \gg 6)$$

where $I^{(k)}(i,j)$ are the sample value at coordinate (i,j) of the prediction signal in list k, k=0,1, which are generated at intermediate high precision $$(\text{i.e., 16-bit}); \frac{\partial I^{(k)}}{\partial x}(i, j) \text{ and } \frac{\partial I^{(k)}}{\partial y}(i, j)$$

are the horizontal and vertical gradients of the sample that are obtained by directly calculating the difference between its two neighboring samples, i.e., $$\frac{\partial I^{(k)}}{\partial x}(i, j) = (I^{(k)}(i+1, j) - I^{(k)}(i-1, j)) \gg 4 \quad (4)$$
$$\frac{\partial I^{(k)}}{\partial y}(i, j) = (I^{(k)}(i, j+1) - I^{(k)}(i, j-1)) \gg 4$$

Based on the motion refinement derived in (1), the final bi-prediction samples of the CU are calculated by interpolating the L0/L1 prediction samples along the motion trajectory based on the optical flow model, as indicated by $$pred_{BDOF}(x, y) = (I^{(0)}(x, y) + I^{(1)}(x, y) + b + o_{offset}) \gg shift \quad (5)$$

$$b = rnd\left(\left(v_x\left(\frac{\partial I^{(1)}(x, y)}{\partial x} - \frac{\partial I^{(0)}(x, y)}{\partial x}\right)\right)/2\right) +$$

$$rnd\left(\left(v_y\left(\frac{\partial I^{(1)}(x, y)}{\partial y} - \frac{\partial I^{(0)}(x, y)}{\partial y}\right)\right)/2\right)$$

where shift and $o_{offset}$ are the right shift value and the offset value that are applied to combine the L0 and L1 prediction signals for bi-prediction, which are equal to 15−BD and 1<<(14−BD)+2·(1<<13), respectively. Table 1 illustrates the specific bit-widths of intermediate parameters that are involved in the BDOF process. As shown in the table, the internal bit-width of the whole BDOF process does not exceed 32-bit. Additionally, the multiplication with the worst possible input happens at the product of $v_x S_{2,m}$ in (1) with input bit-width of 15-bit and 4-bit respectively for $S_{2,m}$ and $v_x$. Therefore, 15-bit multiplier is enough for the BDOF.

TABLE 1

The bit-widths of intermediate parameters of the BDOF in the VVC

| Operation | Parameter | Bit-width |
|---|---|---|
| L0/L1 prediction | $I^{(0)}(i, j), I^{(1)}(i, j)$ | 16 |
| Gradient derivation | $\frac{\partial I^{(0)}}{\partial x}(i, j), \frac{\partial I^{(0)}}{\partial y}(i, j)$ | 13 |
|  | $\frac{\partial I^{(1)}}{\partial x}(i, j), \frac{\partial I^{(1)}}{\partial y}(i, j)$ | 13 |
| Correlation parameter calculation | $\theta(i, j) = (I^{(1)}(i, j) \gg 6) - (I^{(0)}(i, j) \gg 6)$ | 11 |
|  | $\psi_x(i, j) = \left(\frac{\partial I^{(1)}}{\partial x}(i, j) + \frac{\partial I^{(0)}}{\partial x}(i, j)\right) \gg 3$ | 11 |
|  | $\psi_y(i, j) = \left(\frac{\partial I^{(1)}}{\partial y}(i, j) + \frac{\partial I^{(0)}}{\partial y}(i, j)\right) \gg 3$ | 11 |
|  | $\psi_x(i, j) \cdot \psi_x(i, j)$ | 21 |
|  | $\psi_x(i, j) \cdot \psi_y(i, j)$ | 21 |
|  | $\theta(i, j) \cdot \psi_x(i, j)$ | 21 |
|  | $\psi_y(i, j) \cdot \psi_y(i, j)$ | 21 |
|  | $\theta(i, j) \cdot \psi_y(i, j)$ | 21 |
| Summation | $S_1 = \sum_{(i,j)\in\Omega} \psi_x(i, j) \cdot \psi_x(i, j)$ | 27 |
|  | $S_2 = \sum_{(i,j)\in\Omega} \psi_x(i, j) \cdot \psi_y(i, j)$ | 27 |
|  | $S_3 = \sum_{(i,j)\in\Omega} \theta(i, j) \cdot \psi_x(i, j)$ | 27 |
|  | $S_5 = \sum_{(i,j)\in\Omega} \psi_y(i, j) \cdot \psi_y(i, j)$ | 27 |
|  | $S_6 = \sum_{(i,j)\in\Omega} \theta(i, j) \cdot \psi_y(i, j)$ | 27 |

TABLE 1-continued

The bit-widths of intermediate parameters of the BDOF in the VVC

| Operation | Parameter | Bit-width |
|---|---|---|
| Motion refinement derivation | $v_x = S_1 > 0?\ clip3(-th_{BIO}', th_{BIO}', - ((S_3 \cdot 2^3) \gg \lfloor\log_2 S_1\rfloor)): 0$ | 4 |
|  | $S_{2,m} = S_2 \gg 12$ | 15 |
|  | $S_{2,s} = S_2 \& (2^{12} - 1)$ | 12 |
|  | $((v_x S_{2,m}) \ll 12 + v_x S_{2,s})/2$ | 30 |
|  | $S_6 \cdot 2^3 - ((v_x S_{2,m}) \ll 12 + v_x S_{2,s})/2$ | 31 |
|  | $v_y = S_5 > 0?\ clip3(-th_{BIO}', th_{BIO}', - ((S_6 \cdot 2^3 - ((v_x S_{2,m}) \ll 12 + v_x S_{2,s})/2) \gg \lfloor\log_2 S_5\rfloor)): 0$ | 4 |
| Final bi-prediction generation | $v_x \cdot \left(\frac{\partial I^{(1)}}{\partial x}(i, j) - \frac{\partial I^{(0)}}{\partial x}(i, j)\right)$ | 17 |
|  | $v_y \cdot \left(\frac{\partial I^{(1)}}{\partial y}(i, j) - \frac{\partial I^{(0)}}{\partial y}(i, j)\right)$ | 17 |

Decoder-Side Motion Vector Refinement (DMVR)

Figure 5:
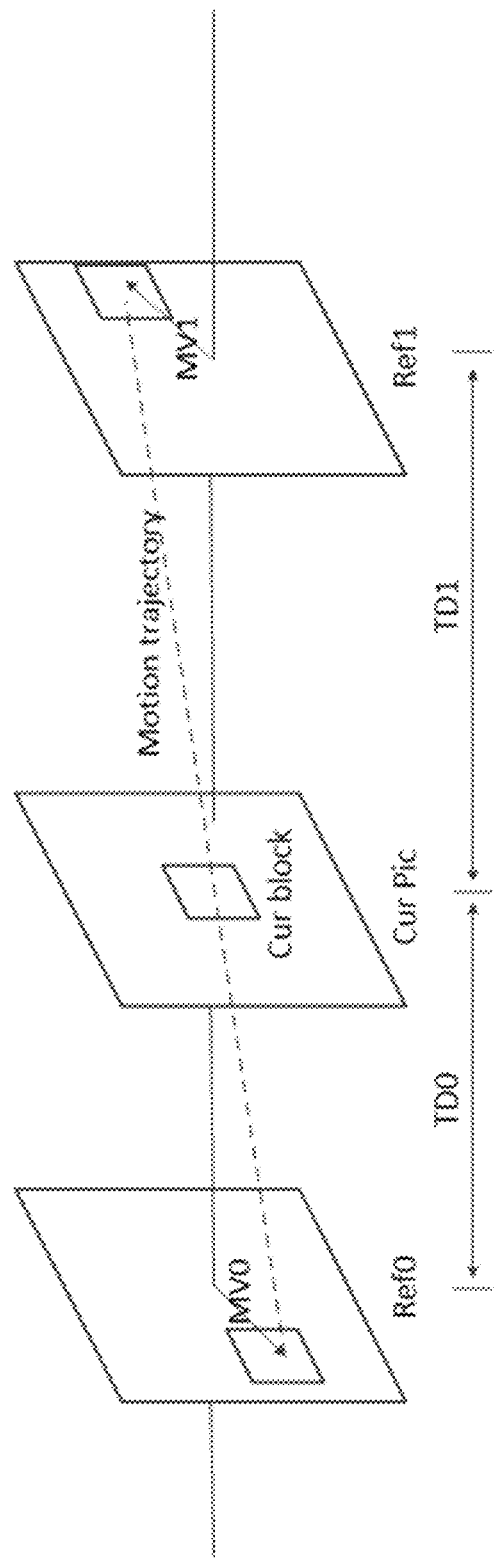
FIG. 5 is a diagram illustrating bilateral matching, according to an example of the present disclosure.

Decoder-side Motion Vector Refinement (DMVR) is a bi-prediction technique for Merge blocks with two initially signaled motion vectors (MV) that can be further refined by using bilateral matching prediction. As shown in the FIG. 5, the bilateral matching is used to derive motion information of the current CU by finding the closest match between two blocks along the motion trajectory of the current CU in two different reference pictures. Where FIG. 5 shows multiple reference lines for the intra prediction in the VVC, in accordance to the present disclosure. The cost function used in the matching process is row-subsampled sum of absolute difference (SAD). After the matching process is done, the refined MVs are used for motion compensation in the prediction stage, boundary strength calculation in deblock filter, temporal motion vector prediction for subsequent pictures and cross-CTU spatial motion vector prediction for subsequent CUs. Under the assumption of continuous motion trajectory, the motion vectors MV0 and MV1 pointing to the two reference blocks shall be proportional to the temporal distances, i.e., TD0 and TD1, between the current picture and the two reference pictures. As a special case, when the current picture is temporally between the two reference pictures and the temporal distance from the current picture to the two reference pictures is the same, the bilateral matching becomes mirror-based bi-directional MV.

Bi-Prediction with Weighted Averaging (BWA)

In HEVC, the bi-prediction signal is generated by averaging two prediction signals obtained from two reference pictures and/or using two motion vectors. In VVC, the bi-prediction mode is extended beyond simple averaging to allow weighted averaging of the two prediction signals.

$$P_{bi-pred}((8-w)*P_0+w*P_1+4)\gg 3 \quad (6)$$

Five weights are allowed in the weighted averaging bi-prediction, w∈{−2, 3, 4, 5, 10}. For each bi-predicted CU, the weight w is determined in one of two ways: 1) for a non-merge CU, the weight index is signaled after the motion vector difference; 2) for a merge CU, the weight index is inferred from neighboring blocks based on the merge candidate index. Weighted averaging bi-prediction is only applied to CUs with 256 or more luma samples (i.e., CU width times CU height is greater than or equal to 256). For pictures without using backward prediction, all 5 weights are used. For pictures using backward prediction, only 3 weights (w∈{3,4,5}) are used.

Merge Mode with MVD (MMVD)

In addition to merge mode, where the implicitly derived motion information is directly used for prediction sample generation of the current CU, the merge mode with motion vector differences (MMVD) is introduced in VVC. A MMVD flag is signaled right after sending a skip flag and a merge flag to specify whether MMVD mode is used for a CU.

In MMVD mode, after a merge candidate is selected, it is further refined by the signaled MVDs information. The MMVD mode information includes a merge candidate flag, a distance index to specify motion magnitude, and a direction index for an indication of motion direction. In MMVD mode, only one of the first two candidates in the merge list is allowed to be selected as a starting MV. The merge candidate flag is signaled to specify which one of the first two candidates are used.

Figure 6A:
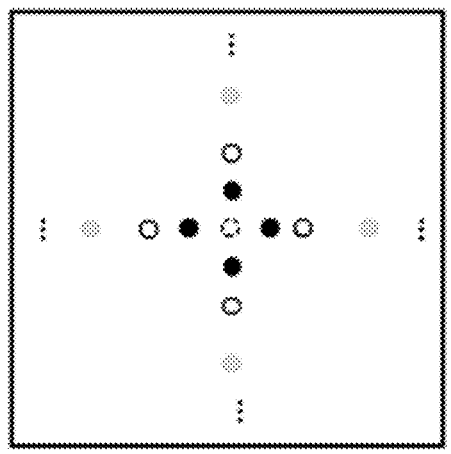
FIG. 6A is a diagram illustrating MMVD Search Point, according to an example of the present disclosure.
Figure 6B:
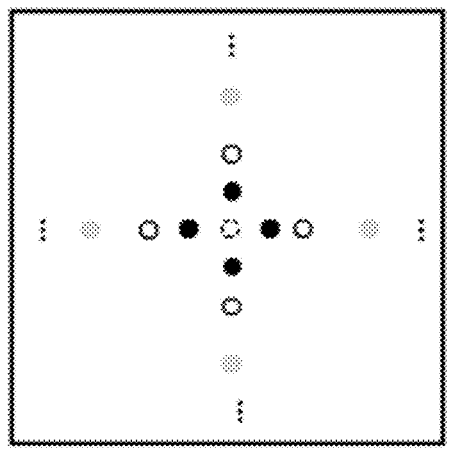
FIG. 6B is a diagram illustrating MMVD Search Point, according to an example of the present disclosure.

The distance index specifies motion magnitude information and indicates a predefined offset from the starting point. As shown in FIGS. 6A and 6B, an offset is added to either horizontal component or vertical component of the starting MV. Where FIG. 6A shows an illustration of the reference samples and the angular directions that are used for the intra prediction of flat rectangular block (W/H=2), in accordance with the present disclosure. Where FIG. 6B shows an illustration of the reference samples and the angular directions that are used for the intra prediction of tall rectangular block (W/H=½), in accordance with the present disclosure. The relation between distance index and predefined offset is specified in Table 2.

TABLE 2

The relation of distance index and predefined offset

| Distance IDX | 0 | 1 | 2 | 3 | 4 | 5 | 6 | 7 |
| --- | --- | --- | --- | --- | --- | --- | --- | --- |
| Offset (in unit of luma sample) | ¼ | 1/2 | 1 | 2 | 4 | 8 | 16 | 32 |

The direction index represents the direction of the MVD relative to the starting point. The direction index can represent the four directions, as shown in Table 3. It's noted that the meaning of MVD sign could be variant according to the information of starting MVs. When the starting MV is a uni-prediction MV or a bi-prediction MV with their referred reference picture(s) pointing to the same side of the current picture (i.e., POCs of up to two reference pictures are both greater than the current picture POC, or are both less than the current picture POC), the sign in Table 3 specifies the sign of MV offset added to the starting MV. When the starting MV is a bi-prediction MV with its two motion vectors pointing to different sides of the current picture (i.e., the POC of one reference picture is greater than the current picture POC, and the POC of the other reference picture is less than the current picture POC), the sign in Table 3 specifies the sign of the MV offset added to the list0 motion vector of the starting MV and the opposite sign of the MV offset added to the list1 motion vector of the starting MV.

TABLE 0

Sign of MV offset specified by direction index

| Direction IDX | 00 | 01 | 10 | 11 |
| --- | --- | --- | --- | --- |
| x-axis | + | − | N/A | N/A |
| y-axis | N/A | N/A | + | − |

BDOF and DMVR

In the current design, it is noted that several constraints are applied to the enabling of BDOF and DMVR. In the current design, BDOF is only enabled when all of the following conditions hold.

First, the current block uses bi-directional prediction, with one MV pointing to a reference picture which is before the current picture in displaying order and another MV pointing to a reference picture which is after the current picture in displaying order.

Second, the weighted prediction is not enabled.

Third, the height of the current block is not equal to 4.

Fourth, the size of the current block is not equal to 4×8 (i.e., a width of 4 and a height of 8).

Fifth, the current block is not coded as symmetric MVD mode, which is a special MVD coding mode in VVC.

Sixth, the current block is not coded as an affine mode.

Seventh, the current block is not coded as a sub-block merge mode.

Eight, the current block is not using different weights when averaging the predictor samples from list 0 and list1 (e.g., BWA with unequal weights).

In the current design, DMVR is only enabled when all of the following conditions hold.

First, the current block uses bi-directional prediction, with one MV pointing to a reference picture which is before the current picture in displaying order and another MV pointing to a reference picture which is after the current picture in displaying order; moreover, the distance between the current picture and the forward reference picture and the distance between the current picture and the backward reference picture shall be the same.

Second, the current block is coded as merge mode and the selected merge candidate is a regular merge candidate (e.g. the normal non-subblock spatial merge candidate or temporal merge candidate, etc.).

Third, the height of the current block is equal or greater than 8.

Fourth, the area of the current block is equal or greater than 64.

Fifth, the current block is not coded as an affine mode.

Sixth, the current block is not coded as a sub-block merge mode.

Seventh, the current block is not coded as MMVD mode.

Although several constraints are already applied to the enabling of BDOF and DMVR, in some cases the two decoder-side inter prediction refinement tools BDOF and DMVR can be both enabled when coding a block. In the current design, when both the decoder-side inter prediction refinement tools are enabled, the BDOF has a dependency on final motion compensated samples of DMVR, which creates latency issues for hardware design.

Applying BDOF or DMVR to an Inter Mode Coded Block

In this embodiment of the present disclosure, it is proposed to exclusively apply BDOF or DMVR to an inter mode coded block according to the mode information of the block. Such mode information includes, but is not limited to, prediction mode such as using merge mode or not, merge mode index, motion vectors, block shape, block size, predictor sample values, etc. It is noted that the proposed methods can be applied on top of the current constraints applied to BDOF and DMVR. The following methods may be applied independently or jointly.

Figure 7:
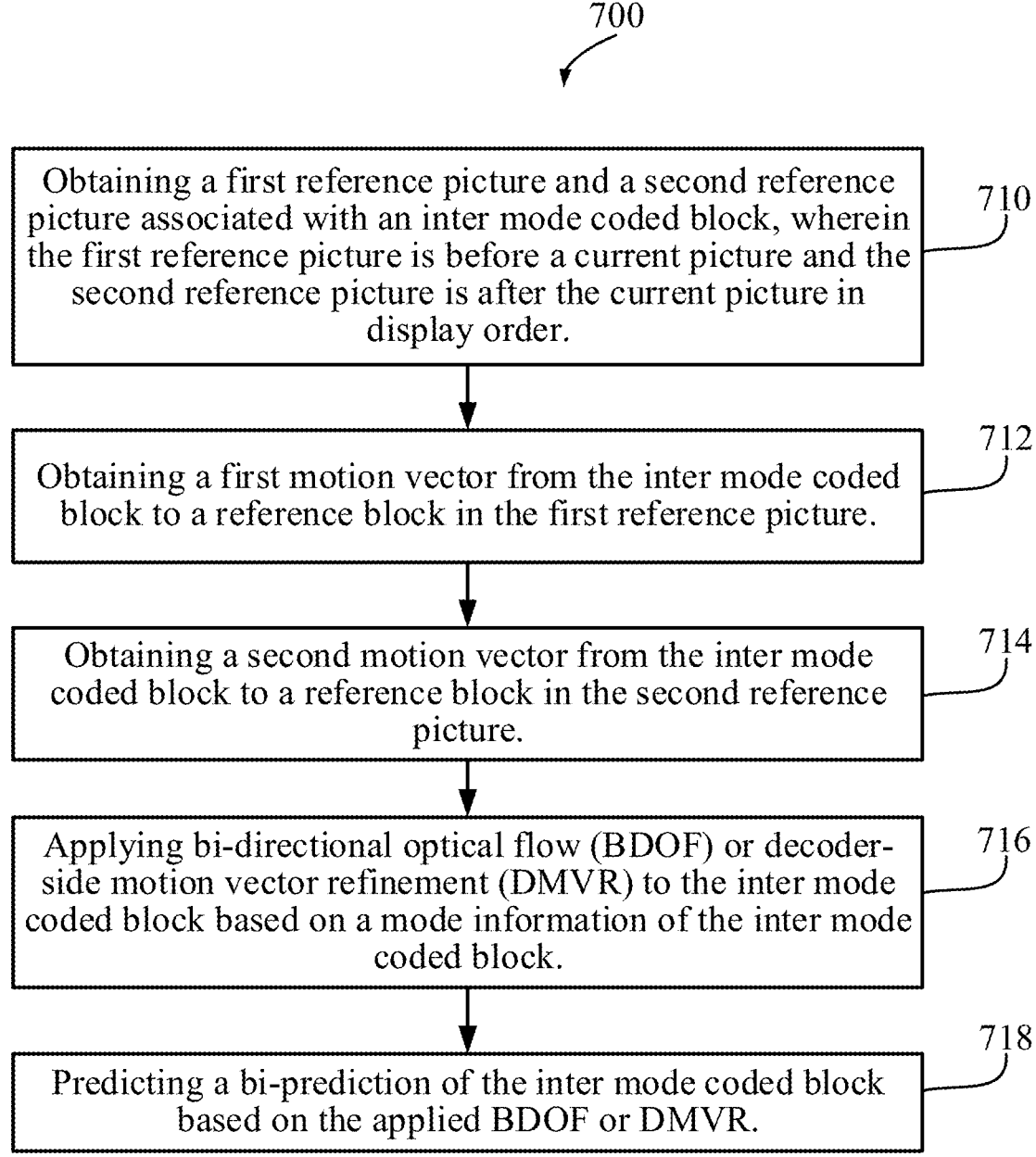
FIG. 7 is a flow chart illustrating a method for coding a video signal, according to an example of the present disclosure.

FIG. 7 shows an example method for coding a video signal in accordance with the present disclosure.

In step 710, obtaining a first reference picture and a second reference picture associated with an inter mode coded block, wherein the first reference picture is before a current picture and the second reference picture is after the current picture in display order.

In step 712, obtaining a first motion vector from the inter mode coded block to a reference block in the first reference picture.

In step 714, obtaining a second motion vector from the inter mode coded block to a reference block in the second reference picture.

In step 716, applying bi-directional optical flow (BDOF) or decoder-side motion vector refinement (DMVR) to the inter mode coded block based on a mode information of the inter mode coded block, wherein the mode information includes the first motion vector and second motion vector.

In step 718, predicting a bi-prediction of the inter mode coded block based on the applied BDOF or DMVR.

In one aspect, the BDOF or DMVR mode is selectively applied to an inter mode coded block according to whether the regular merge mode is chosen for the block. In one example, DMVR is applied only when the regular merge mode is chosen for the block and BDOF is not allowed in this case.

In a second aspect, the BDOF or DMVR mode is selectively applied to an inter mode coded block according to whether the regular merge mode is chosen for the block and also the coded merge index. In one example, DMVR is applied to a block only when the regular merge mode with an odd merge index number is used for the block and BDOF is applied to a block only when the regular merge mode with an even merge index number is used for the block. In another example, DMVR is applied to a block only when the regular merge mode with an even merge index number is used for the block and BDOF is applied to a block only when the regular merge mode with an odd merge index number is used for the block. In a third example, DMVR is applied to a block only when the regular merge mode with a merge index value less than a predefine threshold is used for the block and BDOF is applied to a block only when the regular merge mode with a merge index value equal to or greater than the predefined threshold is used for the block. In a fourth example, DMVR is applied to a block only when the regular merge mode with a merge index value greater than a predefine threshold is used for the block and BDOF is applied to a block only when the regular merge mode with a merge index value equal to or less than the predefined threshold is used for the block.

In a third aspect, the BDOF or DMVR mode is selectively applied to an inter mode coded block according to the motion vectors of the block. In one example, DMVR is enabled when the sum of the magnitude of all the motion vectors components is greater than a predefined threshold while BDOF is enabled when the sum of the magnitude of all the motion vectors components is equal to or less than the predefined threshold. In another example, DMVR is enabled when the difference between the list 0 and list 1 motion vector components is greater than a predefined threshold while BDOF is enabled when the difference between the list 0 and list 1 motion vector components is equal to or less than the predefined threshold. In yet another example, when the selected merge candidate is different from all the previous merge candidates by a predefined threshold (e.g. motion vector difference relative to previous merge candidates is greater than the threshold, and/or it is referring to a different reference picture from those of previous merge candidates, etc.), DMVR is applied; otherwise, BDOF is applied.

In a fourth aspect, the BDOF or DMVR is selectively applied to an inter mode coded block according to the block shape. In one example, DMVR is enabled only when the block is square, while BDOF is enabled only when the block is non-square. In another example, DMVR is enabled only when the block is non-square, while BDOF is enabled only when the block is square.

In a fifth aspect, the BDOF or DMVR is selectively applied to an inter mode coded block according to the block size. In one example, DMVR is enabled only when the block size is greater than a predefined threshold, while BDOF is enabled only when the block size is equal to or less than the predefined threshold. In another example, DMVR is enabled only when the block size is less than a predefined threshold, while BDOF is enabled only when the block size is equal to or greater than the predefined threshold.

In a sixth aspect, the BDOF or DMVR is selectively applied to an inter mode coded block according to the predictor samples. In one example, the SAD or SSD (sum of squared difference) between the list 0 predictor samples and list 1 predictor samples are calculated. DMVR is enabled only when the SAD/SSD value is greater than a predefined threshold, while BDOF is enabled only when the SAD/SSD is equal to or less than a predefined threshold.

In a seventh aspect, one flag is signaled to specify whether BDOF or DMVR is applied to the block.

In an eighth aspect, a separate merge candidate list is generated and used exclusively for DMVR. A syntax is signaled to indicate this DMVR merge mode and a merge index is also signaled if the DMVR merge candidate list size is greater than one. DMVR is not enabled for the other modes.

In a ninth aspect, a separate merge candidate list is generated and used exclusively for BDOF. A syntax is signaled to indicate this BDOF merge mode and a merge index is also signaled if the BDOF merge candidate list size is greater than one. BDOF is not enabled for the other modes where DMVR applies.

In a tenth aspect, the BDOF or DMVR mode is selectively applied to an inter mode coded block according to the motion vector difference (MVD) between the selected merge candidate and its previous merge candidates. When the MVD between the selected merge candidate and every previous merge candidate is not less than a predefined threshold, DMVR is applied; otherwise, BDOF is applied.

According to the disclosure, the MVD between candidates can be calculated using different methods. For example, MVD can be calculated as the sum of the absolute difference between the x-components and the absolute difference between the y-components for both List 0 and List 1 motion vectors, in comparing the selected merge candidate and one of its previous merge candidates. In another example, MVD can be calculated as the average of the absolute difference between the x-components and the absolute difference between the y-components for both List 0 and List 1 motion vectors. In a third instance, MVD can be calculated as the minimum value of the absolute difference between the x-components and the absolute difference between the y-components for both List 0 and List 1 motion vectors. In a fourth instance, MVD can be calculated as the maximum value of the absolute difference between the x-components and the absolute difference between the y-components for both List 0 and List 1 motion vectors.

It is noted that if two candidates have different reference pictures, they are considered as having very large MVDs, and as a result DMVR is applied. The MVD threshold could be set different according to some coded information of the CU, such as its block size. In one example, the threshold value is set as ¼-pixel for blocks with less than 64 pixels, ½-pixel for blocks with less than 256 pixels, and 1-pixel for blocks with equal or more than 256 pixels.

Figure 8:
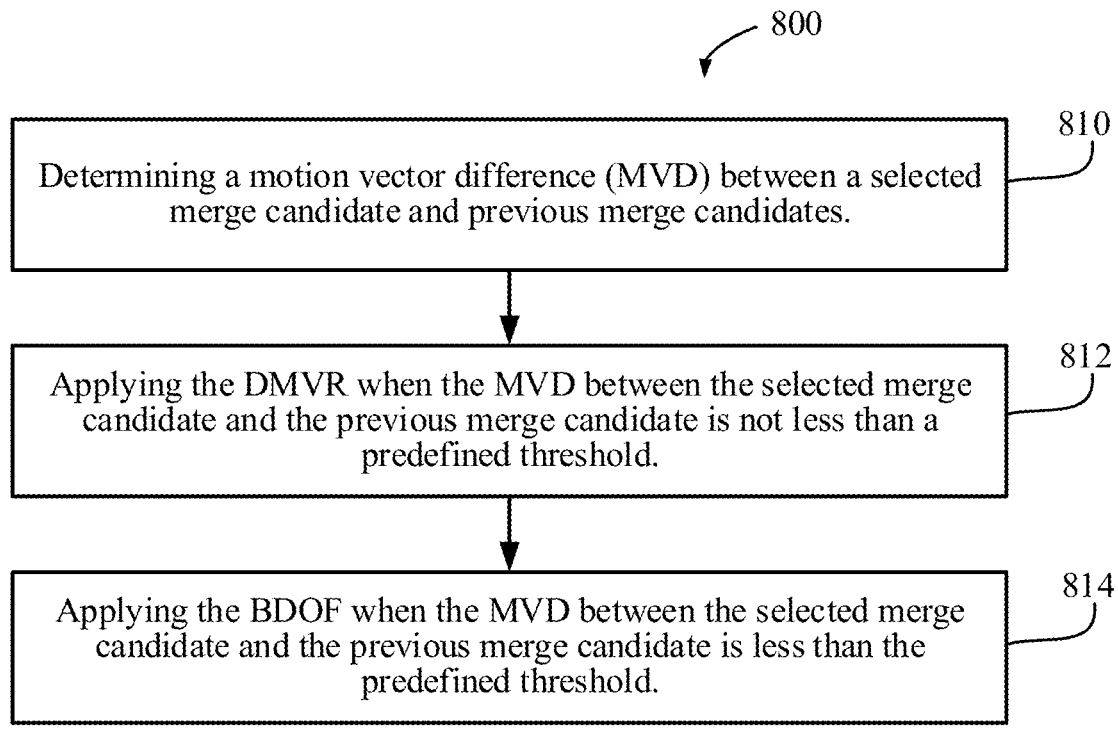
FIG. 8 is a flow chart illustrating a method for applying the BDOF or the DMVR to the inter mode coded block, according to an example of the present disclosure.

In an eleventh aspect, the BDOF or DMVR mode is selectively applied to an inter mode coded block according to the MV magnitude of the selected merge candidate. FIG. 8 shows an example method for applying the BDOF or the DMVR to the inter mode coded block in accordance with the present disclosure.

When the MV magnitude of the selected merge candidate is not less than a predefined threshold, DMVR is applied; otherwise, BDOF is applied. According to the disclosure, the MV magnitude can be calculated using different methods. One such example is to use the sum of the absolute value of the x-components and the absolute value of the y-components for both List 0 and List 1 motion vectors for a given MV.

Another such example is to use the average of the absolute value of the x-components and the absolute value of the y-components for both List 0 and List 1 motion vectors for a given MV. A third example is to use the minimum value of the absolute value of the x-components and the absolute value of the y-components for both List 0 and List 1 motion vectors for a given MV.

A fourth example is to use the maximum value of the absolute value of the x-components and the absolute value of the y-components for both List 0 and List 1 motion vectors for a given MV. The MV magnitude threshold may be set different according to some coded information of the CU, such as its block size. In one example, the threshold value is set as ¼-pixel for blocks with less than 64 pixels, ½-pixel for blocks with less than 256 pixels, and 1-pixel for blocks with equal or more than 256 pixels.

In this disclosure, it is proposed that additional constraints as shown in the following may be applied to DMVR mode enabling. These constraints may be applied independently or jointly.

DMVR is not allowed when the weighted prediction is enabled for the current block.

DMVR is not allowed when different weights are used when averaging the predictor samples from list 0 and list1 for the current block.

In this disclosure, it proposed to extend the BDOF to the sub-block merge mode for further coding gain.

In step 810, determining a motion vector difference (MVD) between a selected merge candidate and previous merge candidates. According to the present disclosure, the MV magnitude can be calculated using different methods. For example, the sum of the absolute value of the x-components and the absolute value of the y-components for both List 0 and List 1 motion vectors for a given MV can be used. For example, the average of the absolute value of the x-components and the absolute value of the y-components for both List 0 and List 1 motion vectors for a given MV can be used. For example, the minimum value of the absolute value of the x-components and the absolute value of the y-components for both List 0 and List 1 motion vectors for a given MV can be used. For example, the maximum value of the absolute value of the x-components and the absolute value of the y-components for both List 0 and List 1 motion vectors for a given MV can be used.

In step 812, applying the DMVR when the MVD between the selected merge candidate and the previous merge candidate is not less than a predefined threshold. When the MV magnitude of the selected merge candidate is not less than a predefined threshold, DMVR is applied; otherwise, BDOF is applied. The MV magnitude threshold may be set differently according to some coded information of the CU, such as its block size. For example, the threshold value can be set as ¼-pixel for blocks with less than 64 pixels, ½-pixel for blocks with less than 256 pixels, and 1-pixel for blocks with equal or more than 256 pixels.

In step 814, applying the BDOF when the MVD between the selected merge candidate and the previous merge candidate is less than the predefined threshold. The MV magnitude threshold may be set differently according to some coded information of the CU, such as its block size. For example, the threshold value can be set as ¼-pixel for blocks with less than 64 pixels, ½-pixel for blocks with less than 256 pixels, and 1-pixel for blocks with equal or more than 256 pixels.

In this embodiment of the present disclosure, it is proposed that additional constraints, as shown in the following, may be applied to DMVR mode enabling. These constraints may be applied independently or jointly.

DMVR is not allowed when the weighted prediction is enabled for the current block.

DMVR is not allowed when different weights are used when averaging the predictor samples from list 0 and list1 for the current block.

In this embodiment of the present disclosure, it proposed to extend the BDOF to the sub-block merge mode for further coding gain.

Figure 9:
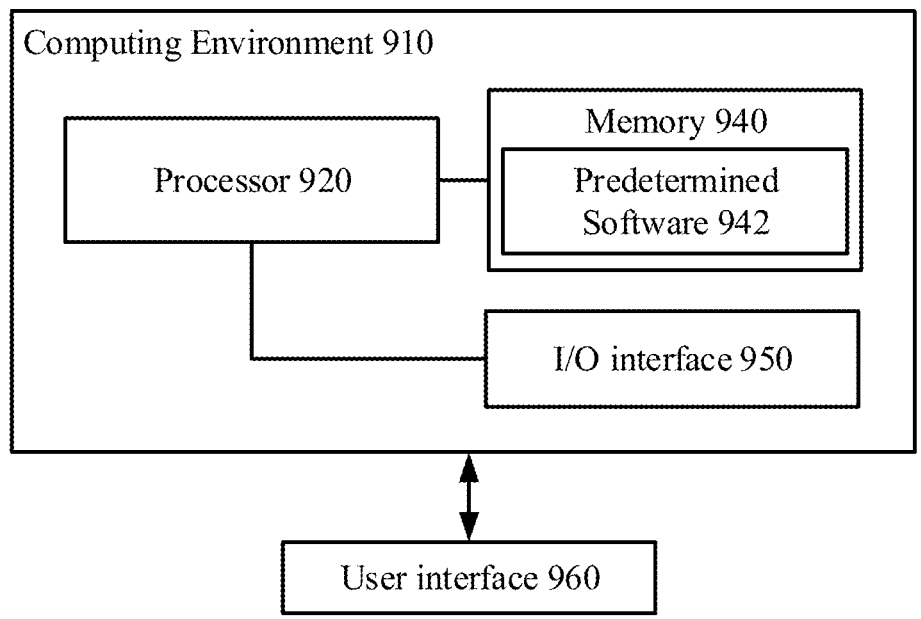
FIG. 9 is a diagram illustrating a computing environment coupled with a user interface, according to an example of the present disclosure.

FIG. 9 shows a computing environment 910 coupled with a user interface 960.

Computing environment 910 can be part of data processing server. Computing environment 910 includes processor 920, memory 940, and I/O interface 950.

The processor 920 typically controls overall operations of the computing environment 910, such as the operations associated with the display, data acquisition, data communications, and image processing. The processor 920 may include one or more processors to execute instructions to perform all or some of the steps in the above-described methods. Moreover, the processor 920 may include one or more modules that facilitate the interaction between the processor 920 and other components. The processor may be a Central Processing Unit (CPU), a microprocessor, a single chip machine, a GPU, or the like.

The memory 940 is configured to store various types of data to support the operation of the computing environment 910. Examples of such data comprise instructions for any applications or methods operated on the computing environment 910, Video datasets, video data, image data, etc. The memory 940 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The I/O interface 950 provides an interface between the processor 920 and peripheral interface modules, such as a keyboard, a click wheel, buttons, and the like. The buttons may include but are not limited to, a home button, a start scan button, and a stop scan button. The I/O interface 950 can be coupled with an encoder and decoder.

In an embodiment, there is also provided a non-transitory computer-readable storage medium comprising a plurality of programs, such as predetermined software 942 comprised in the memory 940, executable by the processor 920 in the computing environment 910, for performing the above-described methods. For example, the non-transitory computer-readable storage medium may be a ROM, a RAM, a CD-ROM, a magnetic tape, a floppy disc, an optical data storage device or the like.

The non-transitory computer-readable storage medium has stored therein a plurality of programs for execution by a computing device having one or more processors, wherein the plurality of programs, when executed by the one or more processors, cause the computing device to perform the above-described method for motion prediction.

In an embodiment, the computing environment 910 may be implemented with one or more application-specific integrated circuits (ASICs), digital signal processors (DSPs), digital signal processing devices (DSPDs), programmable logic devices (PLDs), field-programmable gate arrays (FPGAs), graphical processing units (GPUs), controllers, micro-controllers, microprocessors, or other electronic components, for performing the above methods.

What is claimed is:

1. A method of coding a video signal, comprising:
    obtaining a first reference picture and a second reference picture associated with an inter mode coded block, wherein the first reference picture is before a current picture and the second reference picture is after the current picture in display order;
    obtaining a first motion vector from the inter mode coded block to a reference block in the first reference picture;
    obtaining a second motion vector from the inter mode coded block to a reference block in the second reference picture;
    applying bi-directional optical flow (BDOF) or decoder-side motion vector refinement (DMVR) to the inter mode coded block based on a mode information of the inter mode coded block, wherein the mode information includes the first motion vector and second motion vector; and
    predicting a bi-prediction of the inter mode coded block based on the applied BDOF or DMVR,
    wherein applying the BDOF or the DMVR to the inter mode coded block based on the mode information of the inter mode coded block comprises:
    determining whether a regular merge mode and a coded merge index is chosen for the inter mode coded block;
    applying the DMVR in response to the regular merge mode having an odd merge index number and being used on the inter mode coded block; and
    applying the BDOF in response to the regular merge mode having an even merge index number and being used on the inter mode coded block.

2. The method of claim 1, further comprising:
    providing a flag specifying whether the BDOF or the DMVR is applied to the inter mode coded block.

3. The method of claim 1, further comprising:
    generating a merge candidate list for the BDOF and providing a merge index in response to the merge candidate list being greater than one;
    providing a merge syntax to indicate a BDOF merge mode; and
    disabling the BDOF in response to the DMVR being applied.

4. The method of claim 1, further comprising:
    generating a merge candidate list for the DMVR and providing a merge index in response to the merge candidate list being greater than one;
    providing a merge syntax to indicate a DMVR merge mode; and
    applying the DMVR.

5. A computing device, comprising:
    one or more processors;
    a non-transitory computer-readable storage medium storing instructions executable by the one or more processors, wherein the one or more processors are configured to:
    obtain a first reference picture and a second reference picture associated with an inter mode coded block, wherein the first reference picture is before a current picture and the second reference picture is after the current picture in display order;
    obtain a first motion vector from the inter mode coded block to a reference block in the first reference picture;
    obtain a second motion vector from the inter mode coded block to a reference block in the second reference picture;
    apply bi-directional optical flow (BDOF) or decoder-side motion vector refinement (DMVR) to the inter mode coded block based on a mode information of the inter mode coded block, wherein the mode information includes the first motion vector and second motion vector; and
    predict a bi-prediction of the inter mode coded block based on the applied BDOF or DMVR,
    wherein the one or more processors configured to apply the BDOF or the DMVR to the inter mode coded block based on the mode information of the inter mode coded block are further configured to:
    determine whether a regular merge mode or a coded merge index is chosen for the inter mode coded block;
    apply the DMVR in response to the regular merge mode having an odd merge index number and being used on the inter mode coded block; and
    apply the BDOF in response to the regular merge mode having an even merge index number and being used on the inter mode coded block.

6. A non-transitory computer-readable storage medium storing a plurality of programs for execution by a computing device having one or more processors, wherein the plurality of programs, when executed by the one or more processors, cause the computing device to perform acts comprising:
    obtaining a first reference picture and a second reference picture associated with an inter mode coded block, wherein the first reference picture is before a current picture and the second reference picture is after the current picture in display order;
    obtaining a first motion vector from the inter mode coded block to a reference block in the first reference picture;
    obtaining a second motion vector from the inter mode coded block to a reference block in the second reference picture;
    applying bi-directional optical flow (BDOF) or decoder-side motion vector refinement (DMVR) to the inter mode coded block based on a mode information of the inter mode coded block, wherein the mode information includes the first motion vector and second motion vector; and
    predicting a bi-prediction of the inter mode coded block based on the applied BDOF or DMVR, wherein applying the BDOF or the DMVR to the inter mode coded block based on the mode information of the inter mode coded block comprises:
  determining whether a regular merge mode and a coded merge index is chosen for the inter mode coded block;
  applying the DMVR in response to the regular merge mode having an odd merge index number and being used on the inter mode coded block; and
  applying the BDOF in response to the regular merge mode having an even merge index number and being used on the inter mode coded block.

7. The computing device of claim 5, wherein the one or more processors are further configured to:
  provide a flag specifying whether the BDOF or the DMVR is applied to the inter mode coded block.

8. The computing device of claim 5, wherein the one or more processors are further configured to:
  generate a merge candidate list for the BDOF and provide a merge index in response to the merge candidate list being greater than one;
  provide a merge syntax to indicate a BDOF merge mode; and
  disable the BDOF in response to the DMVR being applied.

9. The computing device of claim 5, wherein the one or more processors are further configured to:
  generate a merge candidate list for the DMVR and provide a merge index in response to the merge candidate list being greater than one;
  provide a merge syntax to indicate a DMVR merge mode; and
  apply the DMVR.

10. The medium of claim 6, wherein the acts further comprising:
  providing a flag specifying whether the BDOF or the DMVR is applied to the inter mode coded block.

11. The medium of claim 6, wherein the acts further comprising:
  generating a merge candidate list for the BDOF and providing a merge index in response to the merge candidate list being greater than one;
  providing a merge syntax to indicate a BDOF merge mode; and
  disabling the BDOF in response to the DMVR being applied.

12. The medium of claim 6, wherein the acts further comprising:
  generating a merge candidate list for the DMVR and providing a merge index in response to the merge candidate list being greater than one;
  providing a merge syntax to indicate a DMVR merge mode; and
  applying the DMVR.

* * * * *